United States Patent [19]
Fukada

[11] Patent Number: 5,622,901
[45] Date of Patent: Apr. 22, 1997

[54] METHOD OF FORMING A SEMICONDUCTOR STRAIN SENSOR

[75] Inventor: Tsuyoshi Fukada, Kariya, Japan

[73] Assignee: Nippondenso Co., Ltd., Kariya, Japan

[21] Appl. No.: 284,292

[22] Filed: Aug. 2, 1994

Related U.S. Application Data

[62] Division of Ser. No. 13,532, Dec. 3, 1992, abandoned, which is a continuation of Ser. No. 652,079, Feb. 7, 1991, abandoned.

[30] Foreign Application Priority Data

Feb. 8, 1990 [JP] Japan .................................. 2-29863

[51] Int. Cl.$^6$ .................................................... H01L 21/77
[52] U.S. Cl. .............................. 438/50; 438/385; 438/17; 438/10
[58] Field of Search .................................... 357/26, 59 F; 73/727; 437/51, 60, 8, 921, 228, 7, 901; 148/DIG. 159, DIG. 136

[56] References Cited

U.S. PATENT DOCUMENTS

| | | | |
|---|---|---|---|
| 3,871,007 | 3/1975 | Wakamiya et al. | 257/523 |
| 4,455,567 | 6/1984 | Lee et al. | |
| 4,579,600 | 4/1986 | Shah et al. | 437/47 |
| 4,618,397 | 10/1986 | Shimizu et al. | 437/8 |
| 4,622,856 | 11/1986 | Binder et al. | 73/727 |
| 4,637,126 | 1/1987 | Lightstone | 437/8 |
| 4,670,969 | 6/1987 | Yamada et al. | 148/DIG. 12 |
| 4,762,801 | 8/1988 | Kapoor | 437/918 |
| 4,843,027 | 6/1989 | Geekie | 437/99 |

FOREIGN PATENT DOCUMENTS

| | | |
|---|---|---|
| 62-234363 | 10/1987 | Japan . |
| 63-23372 | 1/1988 | Japan . |
| 63-23371 | 1/1988 | Japan . |
| 63-52467 | 3/1988 | Japan . |
| 63-299159 | 12/1988 | Japan . |
| 2-49472 | 2/1990 | Japan . |

OTHER PUBLICATIONS

Sze, S.M. *Physics of Semiconductor Devices*, Wiley, 1981, pp. 30–35.
H. Schafer et al., "Temperature–Independent Pressure Sensors Using Polycrystalline Silicon Strain Gauges", Sensors and Actuators, 17 (1989) pp. 521–527.
J. Suski et al., "Polysilicon Soi Pressure Sensor", Sensors and Actuators, 17 (1989) pp. 405–414.

*Primary Examiner*—Michael Trinh
*Attorney, Agent, or Firm*—Cushman Darby & Cushman IP Group of Pillsbury Madison & Sutro LLP

[57] ABSTRACT

In a semiconductor strain sensor, for example, using resistors of a polycrystalline semiconductor material such as polycrystalline silicon as strain gauges, the sum of the temperature coefficient of resistance (TCR) of the resistor and the temperature coefficient of strain sensitivity (TCK) is adjusted not by controlling the impurity carrier concentration but by controlling the resistivity, thereby an output fluctuation due to a change in the temperature can be suppressed.

24 Claims, 6 Drawing Sheets

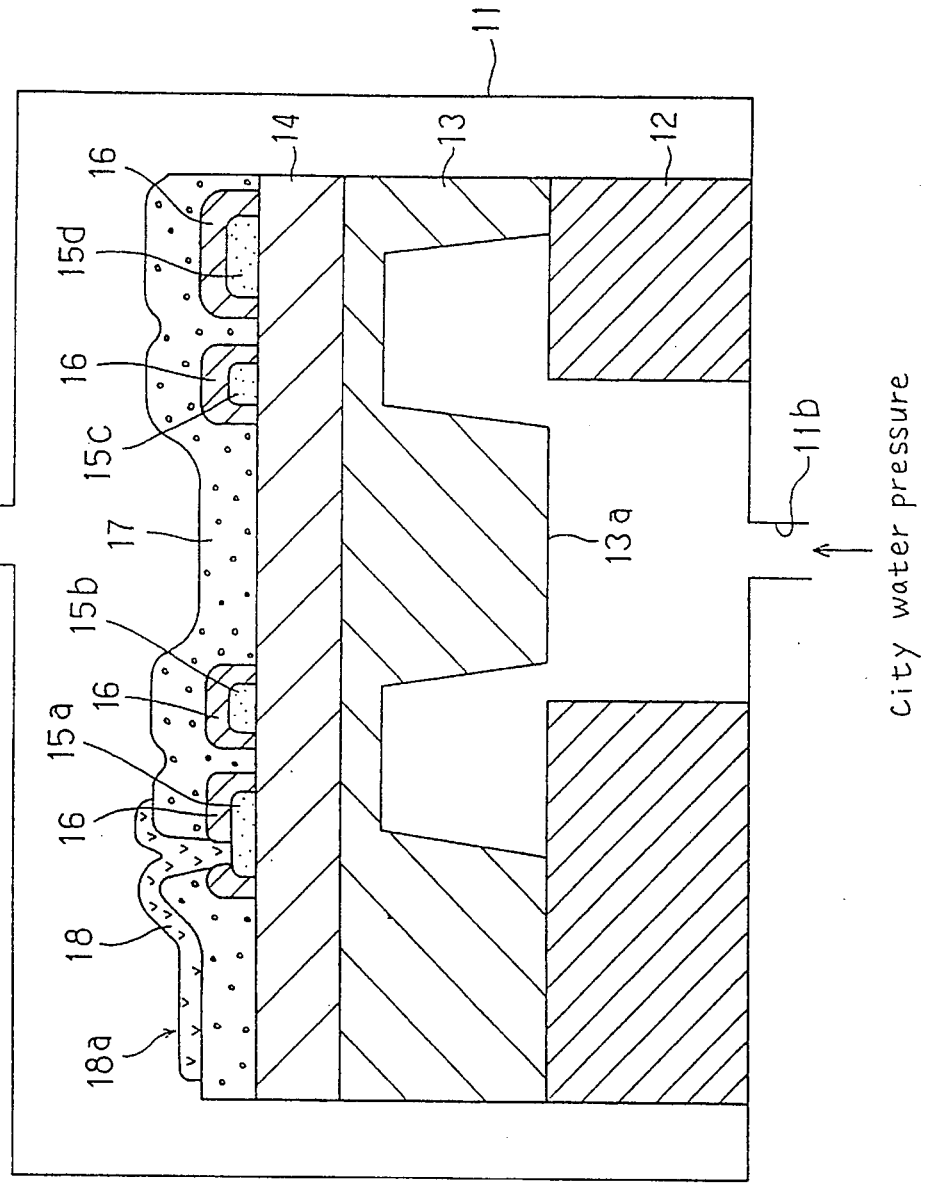

METHOD OF FORMING A SEMICONDUCTOR STRAIN SENSOR

This is a division of application Ser. No. 08/013,532 filed on Dec. 3, 1992, which was abandoned upon the filing hereof and which was a continuation of application Ser. No. 07/652,079, filed Feb. 7, 1991, now abandoned.

BACKGROUND OF THE INVENTION

1. Field of the Invention

The present invention relates to a semiconductor strain sensor having a polycrystalline silicon resistor used as a strain gauge.

2. Description of the Related Art

A semiconductor pressure sensor can detect a pressure with high accuracy using the variation in the resistance value caused by stress (piezoresistive effect) in a resistor that is formed by a semiconductor. Monocrystalline silicon has been conventionally used to form the semiconductor resistor. In recent years, however, development of a semiconductor pressure sensor using a polycrystalline silicon resistor has become significant. The polycrystalline silicon resistor can be easily formed on an insulator, and a high resistance substance can be formed by its thin film formation. Therefore a pressure measurement with high accuracy is expected over a wide temperature range. High resistance formation of the resistor also enables low power consumption in the pressure sensor.

In a semiconductor pressure sensor using the piezoresistive effect, in general, four resistors are formed on a pressure receiving member (diaphragm) and a full bridge is assembled. In this case, when monocrystalline silicon is used as a strain gauge, in order to avoid output fluctuation due to temperature, the semiconductor is formed so that the temperature coefficient of resistance (TCR) and an absolute value of a temperature coefficient of strain sensitivity (TCK) are equal but have opposite signs. That is, the sum becomes "0", and thereby self temperature compensation in constant current is performed. An impurity carrier concentration is adjusted in order to control the temperature coefficients.

The use of polycrystalline silicon resistors are described in the art. "POLYSILICON SOI PRESSURE SENSOR", in Sensors and Actuators, 17(1989)405–414, describes using a polysilicon resistor in a strain gauge environment and also describes a preferred impurity concentration range. "TEMPERATURE-INDEPENDENT PRESSURE SENSORS USING POLYCRYSTALLINE SILICON STRAIN GAUGES", published in Sensors and Actuators 17(1989) 521–527, describes using polysilicon resistors and maintaining the value TCR+TCK=0. Impurity carrier concentration dependence of the temperature coefficients is explained. In this case, the carrier concentration means that within crystal grains.

However, the film thickness of polysilicon shown in these references must be as thick as 0.4 μm–0.5 μm. Thin film formation is required for the high resistance formation and no way of accomplishing this is described by these references.

SUMMARY OF THE INVENTION

As a result of the measurement by the present inventor, a problem has been noted in that as the film thickness is made thinner than 0.4 μm in polycrystalline silicon, the sum of the temperature coefficients becomes negative even in the same carrier concentration.

The reasons for this occurrence as the film is made thinner will now be explained as follows. FIG. 6 shows that polycrystalline silicon 1 is constituted by crystal grains 2, each of which is a single crystal, and grain boundaries 3 between the single crystals. The grain boundary area 3 is amorphous. In this case, since the piezoresistive effect is that within the crystal grains 2, the TCK is determined by the impurity carrier concentration within the crystal grains 2. Consequently, the TCK is relatively independent of the film thickness. On the contrary, the TCR is given from the temperature coefficient $\{(\Delta Rg/\Delta T)/Rg\}$ of resistance Rg within the crystal grains and the temperature coefficient $\{(\Delta Rb/\Delta T)/Rb\}$ of resistance Rb of the grain boundary as follows:

$$TCR = \frac{\sum_{i=1}^{m} \frac{\Delta Rg}{\Delta T} + \sum_{i=1}^{n} \frac{\Delta Rb}{\Delta T}}{\sum_{i=1}^{m} Rg + \sum_{i=1}^{n} Rb}$$

where $\Delta T$ is the change in temperature, m is the number of crystal grains through which current passes, n is the number of grain boundaries through which current passes, and $$R = \sum_{i=1}^{m} Rg + \sum_{i=1}^{n} Rb;$$

R is the total resistance of polycrystalline silicon.

FIG. 7 shows the resistance Rg within the crystal grains and the resistance Rb of the grain boundaries can be considered as being connected in series. The inventor has found that, since the area in the crystal grain 2 is a single crystal, TCR becomes smaller as resistivity increases, and so $\Delta Rg/\Delta T > 0$. Since the area in the grain boundary 3 is amorphous, $\Delta Rb/\Delta T < 0$.

When the polycrystalline silicon 1 is made thinner, as shown in FIG. 8, the film thickness becomes less than the grain diameter of the crystal grains 2, thereby a single layer of the crystal grains 2 is formed. In this state, the ratio of the resistance Rb of the grain boundary 3 to the total resistance R ($=\Sigma Rg + \Sigma Rb$) increases. Consequently, it is believed by the inventor that as the film is made thinner, the TCR is varied in the negative direction and therefore the sum of the temperature coefficients (TCR+TCK) is also varied in the negative direction.

In view of the above-mentioned circumstances, an object of the invention is to provide a semiconductor strain sensor comprising resistors of a polycrystalline semiconductor material such as polycrystalline silicon for use as strain gauges, formed such that even if the strain gauge is subjected to thin film formation so as to make it have a high resistance, the output fluctuation due to temperature is suppressed over a wide temperature range.

In order to attain the foregoing object, the inventor has noticed that the strain gauge is formed not only by the carrier concentration as in the prior art but also by other factors, and as a result of the experimental studies repeated, has found that the sum of the temperature coefficients (TCR+TCK) of the polycrystalline silicon resistor can be determined by controlling the resistivity of the resistor, and further has confirmed that this relation is not dependent on the film thickness of the resistor of polycrystalline or on the film quality such as the grain diameter of the crystal grain.

FIG. 1 shows the measured results of the resistivity of the polycrystalline silicon resistor and the sum of the temperature coefficients using polycrystalline silicon resistors of various values of film thickness (25 nm–1 µm). FIG. 1 shows that the sum of the temperature coefficients can be determined by the resistivity for thin film thicknesses the polycrystalline silicon resistors.

The subject matter of the invention includes a semiconductor strain sensor comprising a bridge circuit constituted by polycrystalline semiconductor resistors as strain gauges, wherein the resistivity of each resistor is specified so as to suppress the fluctuation of the output of the bridge circuit due to temperature.

For example, in general, the temperature range of use of these sensors is at a minimum of 0° C.–40° C. In order that the temperature compensation accuracy of a sensor is made to be ±1% (full scale) in this temperature range, the temperature coefficient must be ±1%/±20° C.=0±500 ppm/°C. (±0.05%/°C.) or less. Consequently, in order to satisfy the temperature coefficient of 0±500 ppm/°C., according to FIG. 1, a polycrystalline silicon resistor having a resistivity of $1.9 \times 10^{-3}$–$3.9 \times 10^{-3}$ Ω·cm at about 300° K. may be formed.

Thus, using the polycrystalline silicon resistor with a resistivity of $1.9 \times 10^{-3}$–$3.9 \times 10^{-3}$ Ω·cm, the sum of the coefficients may be within the range of 0±500 ppm/°C. even in a thin film formation.

According to the invention, since the polycrystalline semiconductor resistor is formed not by controlling the impurity carrier concentration as in the prior art but rather by controlling its resistivity, even when a high resistance formation is intended and by a produced thin film formation, the sum of the temperature coefficients may be within the prescribed allowable range without dependency on the film thickness, and thus the conventional output fluctuation due to temperature change can be suppressed over a wide temperature range.

Also since a high resistance formation is possible, the power consumption is low.

BRIEF DESCRIPTION OF THE DRAWINGS

FIG. 2A is a sectional view showing the schematic structure of the semiconductor pressure sensor of the first embodiment of the invention;

DESCRIPTION OF THE PREFERRED EMBODIMENTS

Figure 1:
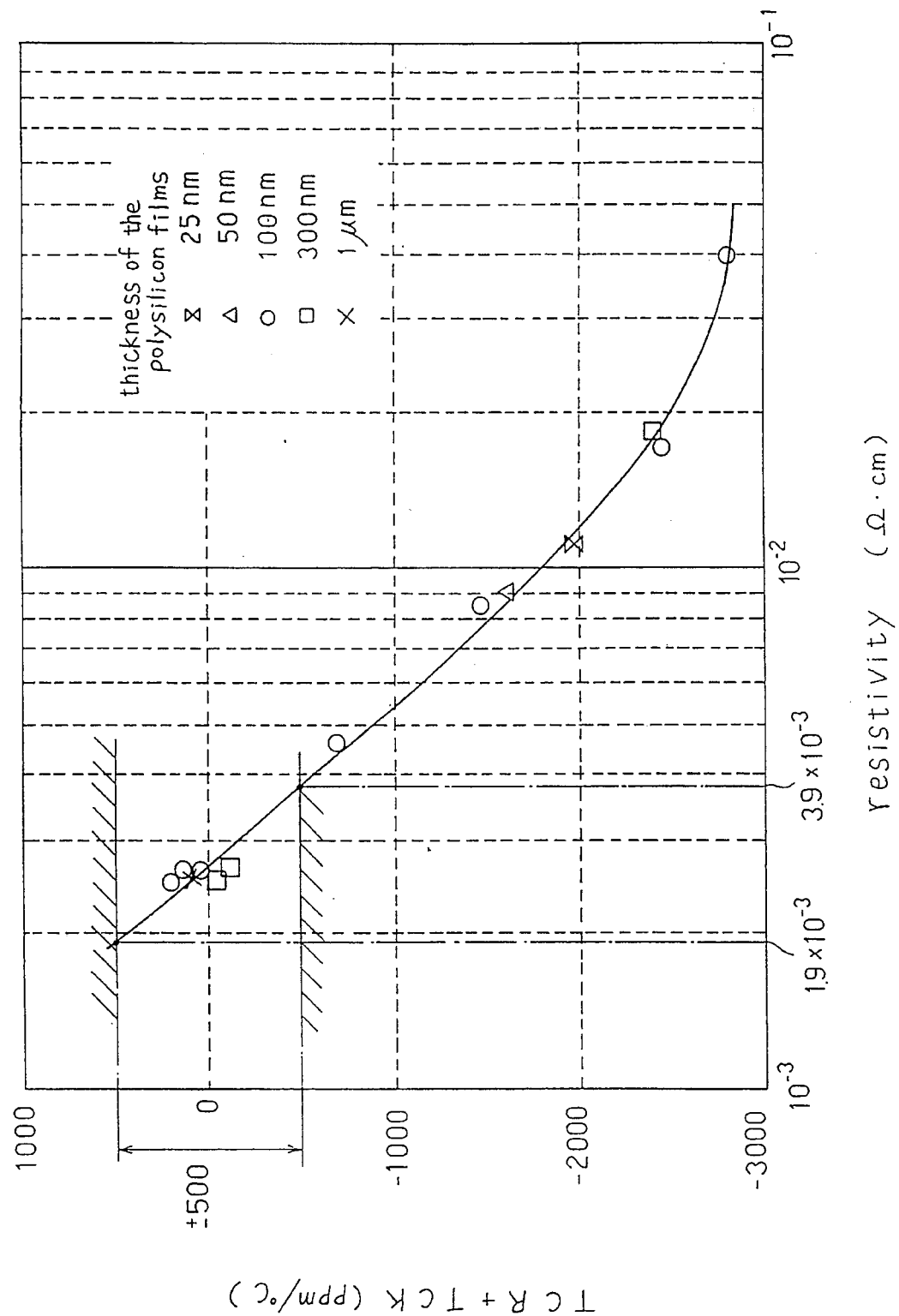
FIG. 1 is a characteristic diagram showing a relation between the resistivity of polycrystalline silicon and the sum of temperature coefficients.

Embodiments of the invention will now be described referring to the accompanying drawings.

FIG. 2A is a sectional view of a semiconductor sensor which is a first embodiment of the invention. The semiconductor sensor is a pressure sensor which measures the water pressure of city water at prescribed time intervals (duty cycle of 1/10). The sensor can be utilized, for example, in a system where warm water and cold water are mixed in a washing lavatory seat and suitable jet pressure is controlled.

In FIG. 2A, a base 12 made of Pyrex glass is installed within a package 11, and a silicon substrate 13 is fixed on the base 12 by an anode junction method. The center portion of the silicon substrate 13 is subjected to a thin film formation and a pressure receiving member (diaphragm) is formed. A projection 13a is formed on the center portion of the pressure receiving member. A silicon oxide film 14 is formed as an insulation film on an upper surface of the silicon substrate 13 to thus make an insulative substrate 13, 14, and four polycrystalline silicon resistors 15a, 15b, 15c, 15d are formed on the silicon oxide film 14 in a location where they can sense the pressure of the pressure receiving member. A film thickness of the polycrystalline silicon resistors 15a–15d is about 5000 Å (0.05 µm), and a resistivity is between $1.9 \times 10^{-3}$ and $3.9 \times 10^{-3}$ Ω·cm.

That is, in order that the temperature compensation accuracy of the sensor is made to be ±1% (full scale) for use in a narrowest temperature range of between 0° C.–40° C., the temperature coefficient must be 0±500 ppm/°C. or less. Therefore, the polycrystalline silicon resistor has a resistivity between $1.9 \times 10^{-3}$ and $3.9 \times 10^{-3}$ Ω·cm at a room temperature of about 300° K. is formed as shown in FIG. 1. The temperature range of 0°–40° C. is wider than that which will be comfortable for a human body, for example, in a washing lavatory seat (bidet) system which controls the warm water pressure jetting to the human body. Therefore if the sensor is made to have an accuracy of ±1% within this range it will always have a sufficient temperature range.

FIG. 2A shows a surface protective film 17, an aluminium electrode wiring layer 18 for electric connection with the polycrystalline silicon resistors 15a–15d, and a pad 18a provided on the surface protective film 17.

Next, an example of a manufacturing method of the sensor will be described.

First, on a surface of a silicon substrate 13 with the plane orientation (100), a silicon oxide film 14 is formed by thermal oxidation, for example, under a wet $O_2$ atmosphere at 1050° C. for 110 minutes.

Figure 2B:
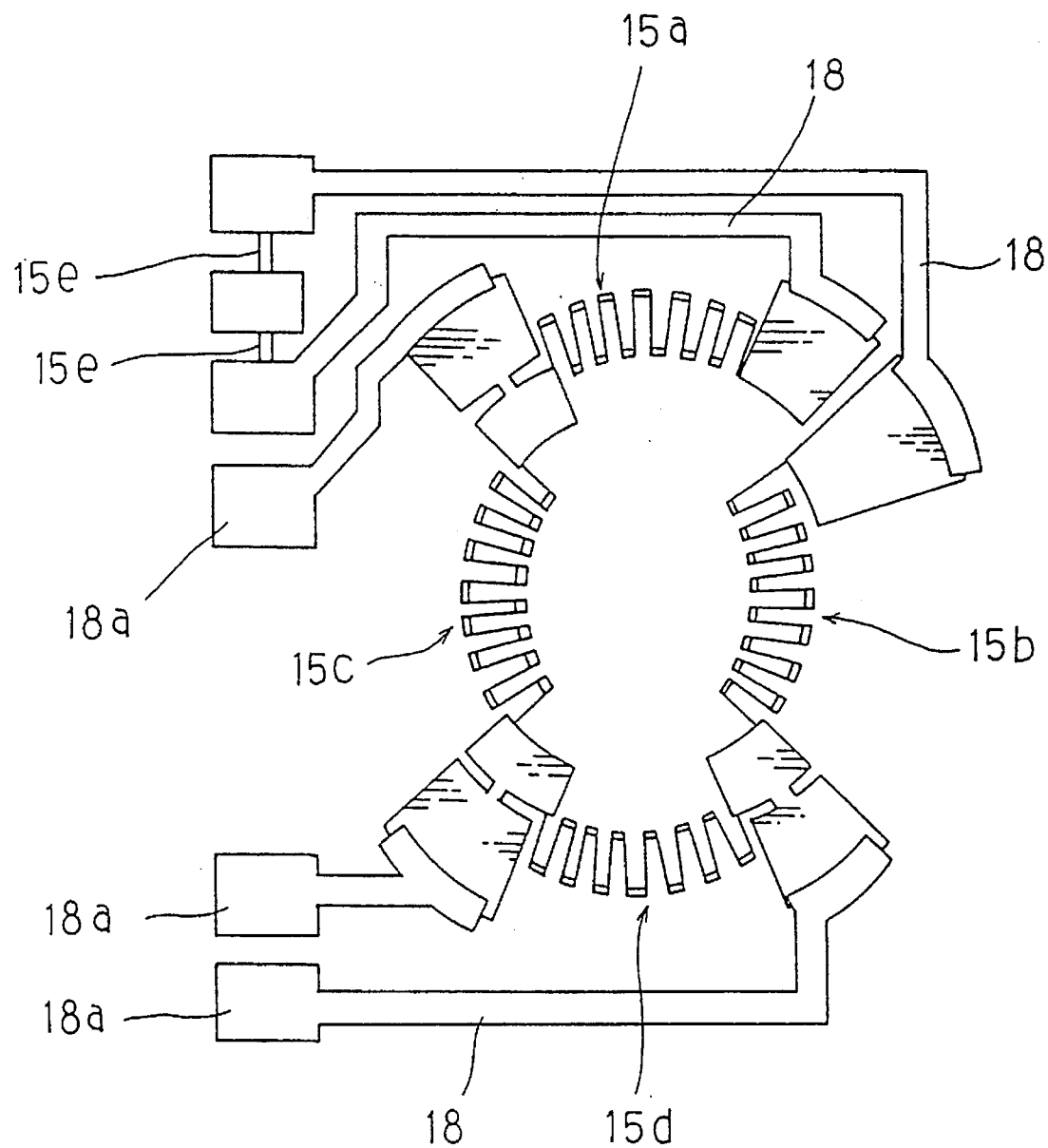
FIG. 2B is a plan view showing the strain gauge arrangement of the semiconductor pressure sensor shown in FIG. 2A.

Next, a low pressure CVD method is performed at 590° C. and polycrystalline silicon is deposited at a thickness of about 120 nm onto the silicon oxide film 14. The deposited polycrystalline film is then patterned, and the patterns of polycrystalline silicon with a comb-like shape as shown in FIG. 2B are formed on four prescribed positions. FIG. 2B shows that a polycrystalline silicon film which constitutes a resistor 15e for adjusting an offset voltage may also be formed.

Next, the surface of the patterned polycrystalline silicon is oxidized by thermal oxidation, for example, under a dry $O_2$ atmosphere at 1000° C. for 86 minutes, thereby forming a silicon oxide film 16 of about 100 nm. The film thickness of the polycrystalline silicon becomes about 72 nm by the growth of the silicon oxide film 16.

Ion implantation of a boron p type impurity is then performed onto the polycrystalline silicon to thereby form polycrystalline silicon resistors 15a–15d. In this case, the ion implantation condition is adjusted so that the peak of the impurity concentration distribution is near the center of the film thickness of the polycrystalline silicon film and the resistivity becomes between $1.9\times10^{-3}$ and $3.9\times10^{-3}$ $\Omega\cdot\text{cm}$. An activation annealing is performed, for example, under an $N_2$ atmosphere at 950° C. for 30 minutes. An actual polycrystalline silicon resistor formed under ion implantation conditions of acceleration voltage of 40 keV and dose amount of $6\times10^{15}$ ions/cm² obtained a resistivity of $2.6\times10^{-3}$ $\Omega\cdot\text{cm}$.

Since a correlation between the resistivity and the impurity concentration of polycrystalline silicon is not obtained as in the single crystal silicon (monocrystal silicon), but rather is varied by its film quality (e.g., grain diameter, grain orientation), it is preferable that the resistivity of the polycrystalline silicon film is measured, for instance, by the well-known four point probe method, in which a constant current is applied at two outer points and a voltage at two inner points is measured to find resistivity. Thereby the optimum dose amount is determined.

Subsequently, a surface protective film 17 such as PSG is formed on the whole surface of the silicon oxide film 14, and an aluminium electrode wiring layer 18 for providing electrical connections from one location to another is formed at a prescribed pattern onto the surface protective film 17. Then, so that the aluminium electrode wiring layer 18 and the polycrystalline silicon resistors 15a–15d are connected electrically, a through hole is used which has been previously opened in the silicon oxide film 16 and the surface protective film 17. FIGS. 2A and 2B show a pad 18a for contact by a wire bond formed when the aluminium electrode wiring layer 18 is patterned.

The etching work of the pressure receiving member is performed from the rear surface of the silicon substrate 13, and subsequently the silicon substrate 13 and the base 12 are subjected to an anode junction processing and stored in the package 11.

In the sensor manufactured as above described, a connection hole 11a of the package 11 is opened to the atmosphere, and a connection hole 11b is connected to the water service pipe. Consequently, the pressure receiving member (diaphragm) of the silicon substrate 13 is deformed by the pressure difference between the atmosphere and the city water.

Figure 3:
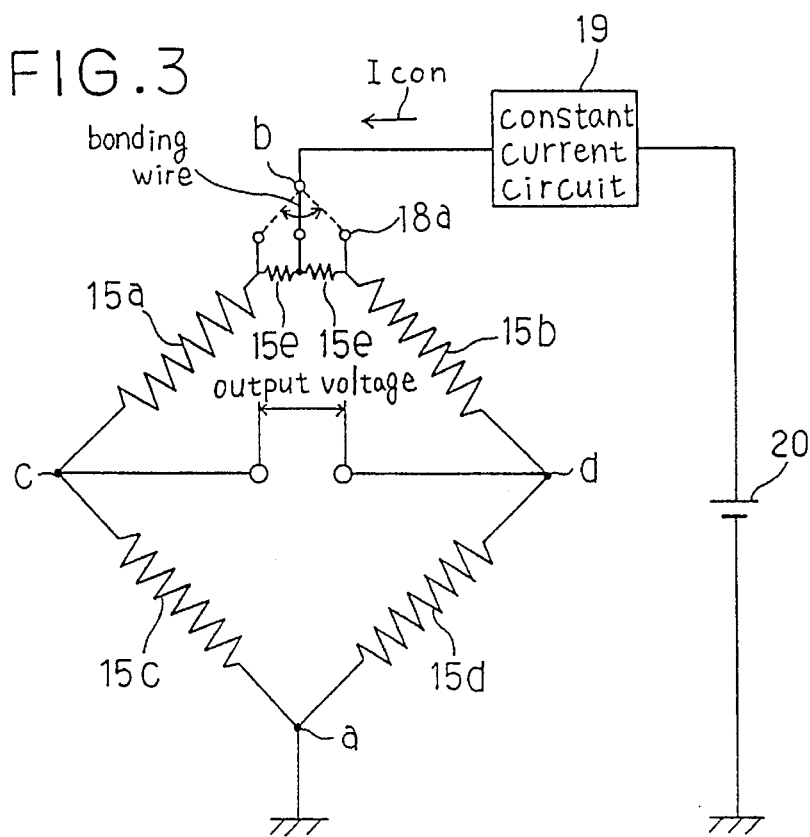
FIG. 3 is an electric circuit diagram showing the bridge constitution of the strain gauges in the semiconductor pressure sensor shown in FIGS. 2A and 2B.

FIG. 3 shows an electric schematic of a sensor Resistor 15e is used for adjusting an offset voltage in FIG. 3. A full bridge is constituted by four polycrystalline silicon resistors 15a–15d. The polycrystalline silicon resistors 15a and 15d are arranged at the position of the pressure receiving member indicating the negative resistance variation at the pressure applied state, and the polycrystalline silicon resistors 15b and 15c are arranged at the position of the pressure receiving member indicating the positive resistance variation at the pressure applied state. An input terminal a is grounded, and an input terminal b is connected through a constant-current circuit 19 to a lithium cell 20 of 3 V with of capacity of 0.5 AH. Then, the total resistance value of the full bridge circuit by the polycrystalline silicon resistors 15a–15d becomes about 150 kΩ depending on the gauge pattern L/w (where L is the gauge length, w is the gauge width).

If a constant voltage is applied between the input terminals a, b, a variation of the potential difference is produced between output terminals c, d at the pressure applied state. The potential difference is taken as the output voltage, and amplified by an amplifier (not shown) and then output. The amplifier is driven by a cell such as lithium cell 20, and the consumption current thereof is about $8\times10^{-5}$ A. The consumption current of the bridge circuit is $2\times10^{-5}$ A. Consequently, the total consumption current of the bridge circuit and the amplifier is $10\times10^{-5}$ A, and the sensor can be used for approximately 5 years with a single lithium cell 20.

Figure 4:
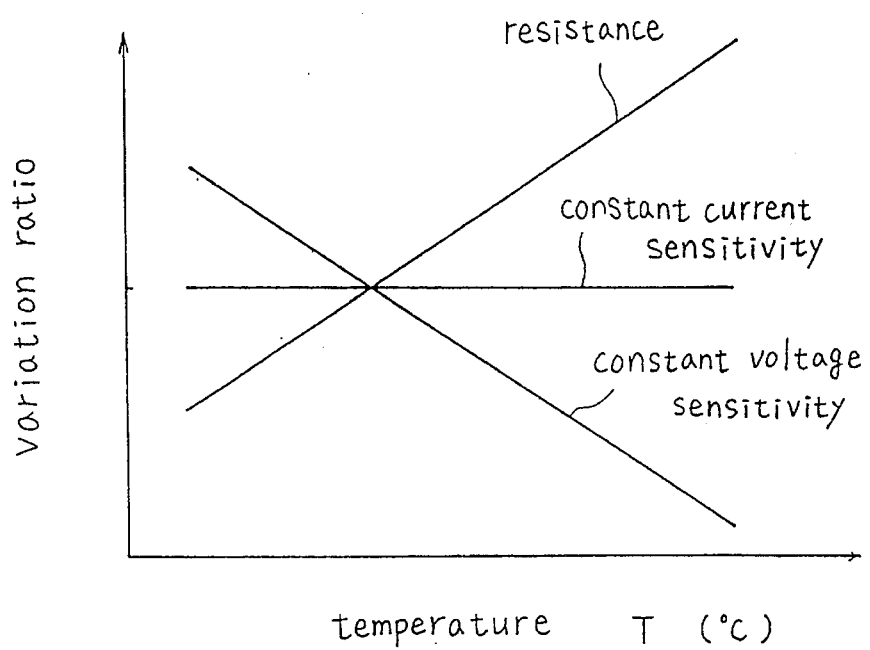
FIG. 4 is a characteristic diagram showing temperature dependence.

FIG. 4 shows the temperature characteristics of the sensor. The resistance values of the polycrystalline silicon resistors 15a–15d indicate a positive temperature coefficient, and the output voltage sensitivity at the pressure applied state indicates the negative temperature coefficient when a constant voltage is applied to the input terminals a and b. The polycrystalline silicon resistors 15a–15d are formed so that the temperature coefficient (TCR) of the resistance values of the polycrystalline silicon resistors 15a–15d and the temperature coefficient (TCK) of the output voltage sensitivity at the constant voltage applied state have equal absolute values and opposite signs.

During the measurement, if a constant current is applied between the input terminals a and b and the temperature is varied, the voltage between the input terminals a and b rises due to the TCR and the output voltage rises proportional to the input voltage, but the output voltage sensitivity is varied in the negative direction due to the temperature coefficient accompanying the temperature rise. Consequently, it follows that TCR+TCK=0, and the temperature coefficient becomes "0"; thereby the temperature compensation is performed.

In the embodiment, in the semiconductor strain sensor where the plurality of polycrystalline silicon resistors 15a–15d are used as strain gauges and the bridge is assembled, the resistivity of the polycrystalline silicon resistors 15a–15d is made to be between $1.9\times10^{-3}$ and $3.9\times10^{-3}$ $\Omega\cdot\text{cm}$. That is, the resistivity is controlled depending not only on the impurity carrier concentration of the polycrystalline silicon resistors as is conventional in the art. Therefore, the sum of the temperature coefficients can be made to be 0±500 ppm/°C.

Consequently, even if the polycrystalline silicon resistors 15a–15d are formed as a thin film (500 Å) having the high resistance formation, the total sum of TCR and TCK can be made to be 0±500 ppm/°C. As a result, a higher resistance bridge is possible as compared with the monocrystalline silicon technology of the prior art. Even when the total resistance value of the bridge circuit is 1 kΩ–4 kΩ and polycrystalline silicon having a thickness of 0.4 µm or more is used, only the resistance value of 10 kΩ–30 kΩ can be attained. However, in the embodiment of the present invention, the total resistance value of the bridge circuit can be made to be as high as 150 kΩ by the thin film formation and thereby the consumption power can be made low. That is, the sensor can be used for long as five years using the lithium cell 20.

In the first embodiment as described above, the polycrystalline silicon resistor is subjected to thin film formation to provide a high resistance formation and the invention is applied thereto, but the unique concept of the invention whereby the resistivity of the resistor controlled by adjusting the sum of the temperature coefficients is also an effective means when a polycrystalline resistor having uncertain film quality is used as a strain gauge.

Figure 5:
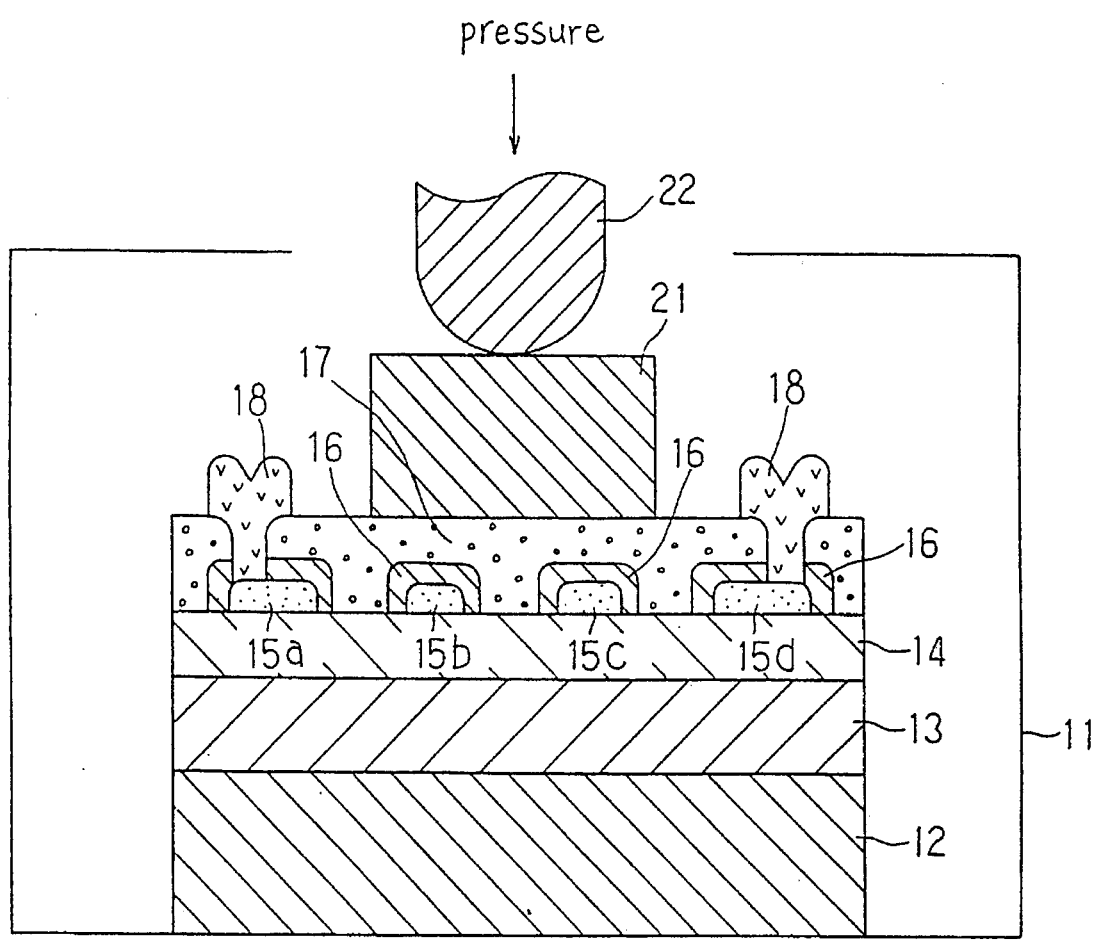
FIG. 5 is a sectional view showing the schematic structure of the engine combustion pressure sensor of the second embodiment of the invention.
Figure 6:
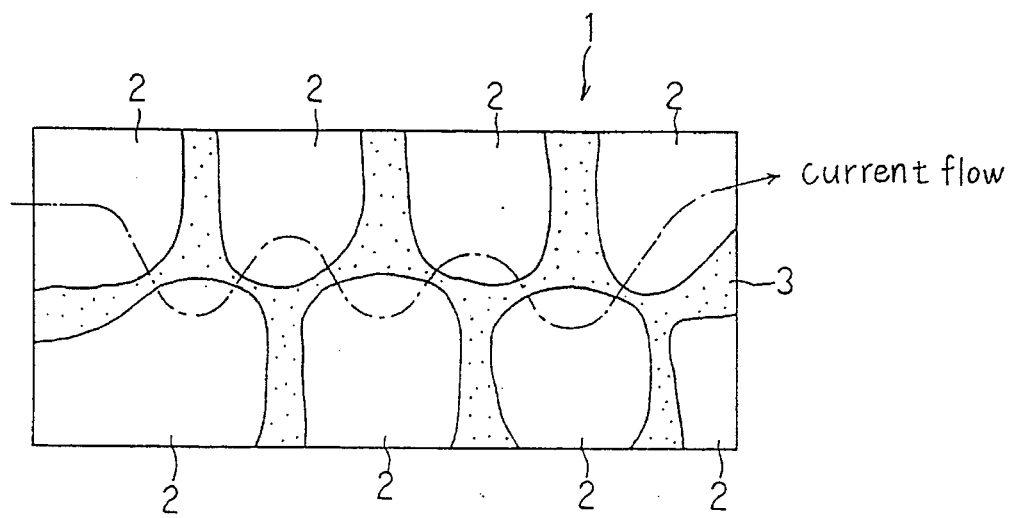
FIG. 6 is a diagram showing a model of a polycrystalline silicon resistor.
Figure 7:
FIG. 7 is an equivalent circuit diagram showing a model of a polycrystalline silicon resistor.
Figure 8:
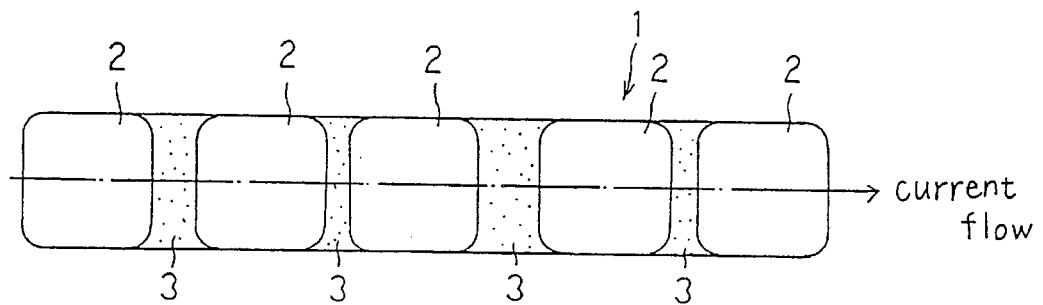
FIG. 8 is a diagram showing a model of a polycrystalline silicon resistor in thin film formation being modeled.

FIG. 5 shows a schematic structure of an engine combustion pressure sensor which is a second embodiment of the invention.

Although FIG. 2A shows the pressure sensor having a thin pressure receiving member, the sensor in FIG. 5 does not have such a thin pressure receiving member. A stress is applied among the four polycrystalline silicon resistors 15a–15d constituted in the full bridge as shown in FIG. 3 in the film thickness direction of the two resistors 15a, 15c to thereby constitute a so-called load cell type sensor. FIG. 5 shows a pressure receiving glass 21 as a substrate for transmitting pressure to the resistors 15b, 15c and a rod 22 for changing the pressure within the engine into a moving quantity and transmitting it as stress to the pressure receiving glass 21. In FIG. 5, the same structure as that shown in FIG. 2A is designated by the same reference numerals.

The pressure within the engine in this embodiment is transmitted through the rod 22 to the resistors 15b, 15c, and the temperature within the engine is radiated through the rod 22 or a thermal insulator (not shown), so that it is not applied directly to the sensing member. Even if a high temperature within the engine is applied, therefore, since the polycrystalline silicon resistors 15a–15d constituting strain sensors are separated by insulation formed by the silicon oxide films 14, 16, the resistors can be separated electrically from the substrate even at a high temperature (150° C. or more).

Also in this embodiment, the resistivity of the polycrystalline silicon resistor is made to be between $1.9 \times 10^{-3}$ and $3.9 \times 10^{-3}$ $\Omega \cdot cm$ in manner similar to the first embodiment, and the sum of the temperature coefficients is adjusted to be $0 \pm 500$ ppm/°C., so that an output fluctuation due to a change in the temperature can be suppressed.

In this embodiment, since the temperature of use of the sensor becomes as high as 80° C.–150° C. for example, the temperature compensation accuracy for an allowable range of the temperature coefficient may be set narrower than a usable temperature range, and thus the optimum range of the resistivity may be set to the narrower range of between $1.9 \times 10^{-3}$ and $3.9 \times 10^{-3}$ $\Omega \cdot cm$.

The invention is not limited the various embodiments described. For example, although a full bridge is formed by the polycrystalline silicon resistors 15a–15d in the various embodiments, a half bridge may be formed by two polycrystalline silicon resistors; thereby the function is similar and the output voltage can be taken in response to the pressure. Also, a pressure-sensitive element of load cell type may be formed by one polycrystalline silicon resistor.

The sensor may be used not only as a pressure sensor but also as an acceleration sensor. Further, while in the first embodiment, the silicon oxide film 14 (insulation film) is formed on the pressure receiving member by the silicon substrate 13 being thinned, and the polycrystalline silicon resistors 15a–15d are formed on the silicon oxide film 14, but the polycrystalline resistors may be formed on the thinned insulation film and the insulation film may be made as a pressure receiving member; thereby a so-called micro diaphragm structure may be constituted.

Also in the first embodiment, although the projection 13a is formed at the center of the pressure receiving member (silicon substrate 13), a sensor having a pressure receiving member without a projection 13a may be embodied.

Finally, the techniques of the invention may be used by a resistor layer formation.

What is claimed is:

1. A method of forming a temperature coefficient of strain sensitivity (TCK) compensated semiconductor strain sensor including a detection circuit, said method comprising the steps of:

forming a polycrystalline silicon resistor film including grains of a crystal on an insulative substrate at a stress receiving region of said insulative substrate, said polycrystalline silicon resistor film having a piezoelectric effect and being formed to have a thickness of less than 0.4 μm, said step of forming said polycrystalline silicon resistor film including a step of:

setting a resistivity of said polycrystalline silicon resistor film having said thickness of less than 0.4 μm to a value between $1.9 \times 10^{-3}$ and $3.9 \times 10^{-3}$ $\Omega \cdot cm$ at room temperature; and forming said detection circuit to be in electrical contact with said polycrystalline silicon resistor film corresponding to an amount of strain applied to said stress receiving region of said insulative substrate;

wherein said thickness of said polycrystalline silicon resistor film corresponds to a thickness of a single layer of said grains of said crystal included in said polycrystalline silicon resistor film.

2. A method of forming said TCK compensated semiconductor strain sensor according to claim 1, wherein:

said polycrystalline silicon resistor film is formed to have a thickness of less than 0.1 μm.

3. A method of forming said TCK compensated semiconductor strain sensor according to claim 1, wherein said step of setting said resistivity of said polycrystalline silicon resistor film includes the step of:

introducing an impurity into said polycrystalline silicon resistor film at an optimum dose amount to form said polycrystalline silicon resistor film;

whereby said polycrystalline silicon resistor film is controlled to have said resistivity of between $1.9 \times 10^{-3}$ and $3.9 \times 10^{-3}$ $\Omega \cdot cm^{-3}$ at room temperature at said thickness of less than 0.4 μm.

4. A method of forming said TCK compensated semiconductor strain sensor according to claim 3, wherein said step of introducing said impurity into said polycrystalline silicon film includes a step of:

ion implanting said impurity.

5. A method of forming said TCK compensated semiconductor strain sensor according to claim 4, wherein said step of ion implanting said impurity includes a step of:

adjusting an ion implantation condition such that a peak of impurity concentration distribution as implanted is located at approximately a center of said thickness of said polycrystalline silicon film.

6. A method of forming said TCK compensated semiconductor strain sensor according to claim 5, further comprising, after said step of ion implanting said impurity, a step of:

annealing said polycrystalline silicon film to activate said impurity.

7. A method of forming said TCK compensated semiconductor strain sensor according to claim 1, wherein said step of setting said resistivity of said polycrystalline silicon resistor film includes the step of:

introducing an impurity into said polycrystalline silicon resistor film at an optimum first dose amount to form a first polycrystalline silicon resistor film having said thickness of less than 0.4 μm;

wherein said optimum dose amount of said impurity in said polycrystalline silicon resistor film has said thickness of less than 0.4 μm, said polycrystalline silicon resistor film has a resistivity in a range between $1.9 \times 10^{-3}$ and $3.9 \times 10^{-3}$ $\Omega \cdot cm$ at room temperature, and said optimum dose amount of said impurity is based on self compensation between a temperature coefficient of resistance (TCR) of said polycrystalline silicon resistor film and a temperature coefficient of strain sensitivity of said polycrystalline silicon resistor film, whereby said polycrystalline silicon resistor film is controlled at said thickness less than 0.4 μm to have said resistivity of between $1.9 \times 10^{-3}$ and $3.9 \times 10^{-3}$ $\Omega \cdot m$ at room temperature.

8. A method of forming said TCK compensated semiconductor strain sensor according to claim 7, wherein said step of introducing said impurity into said polycrystalline silicon film includes a step of:

ion implanting said impurity.

9. A method of forming said TCK compensated semiconductor strain sensor according to claim 8, wherein said step of ion implanting said impurity includes a step of:

adjusting an ion implantation condition such that a peak of impurity concentration distribution as implanted is located at approximately a center of said thickness of said polycrystalline silicon film.

10. A method of forming said TCK compensated semiconductor strain sensor according to claim 9, further comprising, after said step of ion implanting said impurity, a step of:

annealing said polycrystalline silicon film.

11. A method of forming said TCK compensated semiconductor strain sensor according to claim 5, wherein said step of ion implanting said impurity includes a step of ion implanting said impurity with an acceleration voltage of 40 keV at a dose amount of $6 \times 10^{15}$ ions/cm$^2$.

12. A method of forming said TCK compensated semiconductor strain sensor according to claim 5, wherein said step of ion implanting said impurity includes a step of ion implanting a p-type boron impurity.

13. A method of forming a temperature coefficient of strain sensitivity (TCK) compensated semiconductor strain sensor including a detection circuit, said method comprising the steps of:

forming a polycrystalline silicon resistor film including grains of a crystal on an insulative substrate at a stress receiving region of said insulative substrate, said polycrystalline silicon resistor film having a piezoelectric effect and being formed to have a thickness of less than 0.4 µm, said step of forming said polycrystalline silicon resistor film including a step of:

setting a resistivity of said polycrystalline silicon resistor film having said thickness of less than 0.4 µm to a value between $1.9 \times 10^{-3}$ and $3.9 \times 10^{-3}$ Ω·cm at room temperature; and forming said detection circuit to be in electrical contact with said polycrystalline silicon resistor film corresponding to an amount of strain applied to said stress receiving region of said insulative substrate;

wherein said polycrystalline silicon resistor film is thinner than a single layer of said grains of said crystal included in said polycrystalline silicon resistor film.

14. A method of forming said TCK compensated semiconductor strain sensor according to claim 13, wherein said polycrystalline silicon resistor film is formed to have a thickness of less than 0.1 µm.

15. A method of forming said TCK compensated semiconductor strain sensor according to claim 13, wherein said step of setting said resistivity of said polycrystalline silicon resistor film includes the step of:

introducing an impurity into said polycrystalline silicon resistor film at an optimum dose amount to form said polycrystalline silicon resistor film;

whereby said polycrystalline silicon resistor film is controlled to have said resistivity of between $1.9 \times 10^{-3}$ and $3.9 \times 10^{-3}$ Ω·cm$^{-3}$ at room temperature at said thickness of less than 0.4 µm.

16. A method of forming said TCK compensated semiconductor strain sensor according to claim 15, wherein said step of introducing said impurity into said polycrystalline silicon film includes a step of:

ion implanting said impurity.

17. A method of forming said TCK compensated semiconductor strain sensor according to claim 16, wherein said step of ion implanting said impurity includes a step of:

adjusting an ion implantation condition such that a peak of impurity concentration distribution as implanted is located at approximately a center of said thickness of said polycrystalline silicon film.

18. A method of forming said TCK compensated semiconductor strain sensor according to claim 17, wherein said step of ion implanting said impurity includes a step of ion implanting said impurity with an acceleration voltage of 40 keV at a dose amount of $6 \times 10^{15}$ ions/cm$^2$.

19. A method of forming said TCK compensated semiconductor strain sensor according to claim 17, wherein said step of ion implanting said impurity includes a step of ion implanting a p-type boron impurity.

20. A method of forming said TCK compensated semiconductor strain sensor according to claim 17, further comprising, after said step of ion implanting said impurity, a step of:

annealing said polycrystalline silicon film to activate said impurity.

21. A method of forming said TCK compensated semiconductor strain sensor according to claim 13, wherein said step of setting said resistivity of said polycrystalline silicon resistor film includes the step of:

introducing an impurity into said polycrystalline silicon film at an optimum first dose amount to form a first polycrystalline silicon resistor film having said thickness of less than 0.4 µm;

wherein said optimum dose amount of said impurity in said polycrystalline silicon resistor film having said thickness of less than 0.4 µm, said polycrystalline silicon resistor film has a resistivity in a range between $1.9 \times 10^{-3}$ and $3.9 \times 10^{-3}$ Ω·cm at room temperature, and said optimum dose amount of said impurity is based on self compensation between a temperature coefficient of resistance (TCR) of said polycrystalline silicon resistor film and a temperature coefficient of strain sensitivity of said polycrystalline silicon resistor film, whereby said polycrystalline silicon resistor film is controlled at said thickness less than 0.4 µm to have said resistivity of between $1.9 \times 10^{-3}$ and $3.9 \times 10^{-3}$ Ω·m· at room temperature.

22. A method of forming said TCK compensated semiconductor strain sensor according to claim 21, wherein said step of introducing said impurity into said polycrystalline silicon film includes a step of:

ion implanting said impurity.

23. A method of forming said TCK compensated semiconductor strain sensor according to claim 21, wherein said step of ion implanting said impurity includes a step of:

adjusting an ion implantation condition such that a peak of impurity concentration distribution as implanted is located at approximately a center of said thickness of said polycrystalline silicon film.

24. A method of forming said TCK compensated semiconductor strain sensor according to claim 23, further comprising, after said step of ion implanting said impurity, a step of:

annealing said polycrystalline silicon film.

* * * * *